United States Patent [19]

Kishi et al.

[11] Patent Number: 4,659,265

[45] Date of Patent: Apr. 21, 1987

[54] TOOL RADIUS COMPENSATION METHOD FOR NUMERICALLY CONTROLLED APPARATUS

[75] Inventors: Hajimu Kishi, Hino; Kunio Tanaka, Hachioji, both of Japan

[73] Assignee: Fanuc Ltd, Minamitsuru, Japan

[21] Appl. No.: 463,890

[22] PCT Filed: May 27, 1982

[86] PCT No.: PCT/JP82/00199

§ 371 Date: Jan. 25, 1983

§ 102(e) Date: Jan. 25, 1983

[87] PCT Pub. No.: WO82/04336

PCT Pub. Date: Dec. 9, 1982

[30] Foreign Application Priority Data

May 27, 1981 [JP] Japan .................................. 56-080438

[51] Int. Cl.$^4$ .......................... B23B 39/26; G05B 19/24
[52] U.S. Cl. ..................................... 409/84; 318/572; 364/168; 409/132
[58] Field of Search ...................... 409/79, 80, 84, 125, 409/126, 131, 132, 95, 119, 120; 51/237, 326; 408/13; 364/168, 169, 170; 318/572, 573, 574

[56] References Cited

U.S. PATENT DOCUMENTS

| | | | |
|---|---|---|---|
| 3,123,657 | 3/1964 | Clark, Jr. et al. ................. | 409/80 X |
| 3,276,327 | 10/1966 | Arrowsmith et al. ................ | 409/80 |
| 3,328,655 | 6/1967 | Tripp ................................ | 318/573 X |
| 3,641,872 | 2/1972 | Ulfhelm ............................. | 409/80 |
| 3,770,947 | 11/1973 | Deily ............................... | 364/169 X |
| 3,890,118 | 6/1965 | Takahashi et al. ................ | 51/287 |
| 4,035,706 | 7/1977 | Cutler .............................. | 364/170 X |
| 4,070,608 | 1/1978 | Rosshirt et al. ................. | 364/169 X |
| 4,163,932 | 8/1979 | Leenhouts ......................... | 318/573 |
| 4,337,566 | 7/1982 | Dimatteo et al. ................. | 409/95 X |
| 4,503,493 | 3/1985 | Burkhardt et al. ................ | 408/13 X |
| 4,516,211 | 5/1985 | Nozawa et al. .................... | 364/170 X |
| 4,546,427 | 10/1985 | Kishi et al. ..................... | 364/168 |

FOREIGN PATENT DOCUMENTS

| | | | |
|---|---|---|---|
| 0075022 | 10/1982 | European Pat. Off. ............. | 409/84 |
| 0071378 | 2/1983 | European Pat. Off. ............. | 409/84 |
| 0092379 | 10/1983 | European Pat. Off. ............. | 409/84 |
| 0514667 | 9/1976 | U.S.S.R. .............................. | 409/131 |
| 0757302 | 5/1980 | U.S.S.R. .............................. | 409/131 |
| 0884884 | 11/1981 | U.S.S.R. .............................. | 409/84 |

*Primary Examiner*—Gil Weidenfeld
*Assistant Examiner*—Glenn L. Webb
*Attorney, Agent, or Firm*—Staas & Halsey

[57] ABSTRACT

The present invention relates to a tool radius compensation method for numerically controlled apparatus in which the coordinates Pi of the position of a tool center are computed which is offset a distance equal to the radius r of the tool in a direction normal to a surface to be cut based on commanded positional information $P_1$, Pc and $P_2$, for enabling the tool to three-dimensionally cut a workpiece. Based on the positional information $P_1$, Pc and $P_2$, a unit offset vector Vi is determined which lies on a plane defined by vectors U and V normal to first and second surfaces to be cut at a three-dimensional corner point Pc. Components along respective axes of the unit offset vector Vi are corrected so that the tool center will move smoothly along a curve contiguous to paths of movement of the tool center before and after the three-dimensional corner point Pc. The coordinates Pi of the position of the tool center are determined from the corrected unit offset vector Vi', a tool radius r, and the information Pc on the position of the three-dimensional corner point.

6 Claims, 8 Drawing Figures

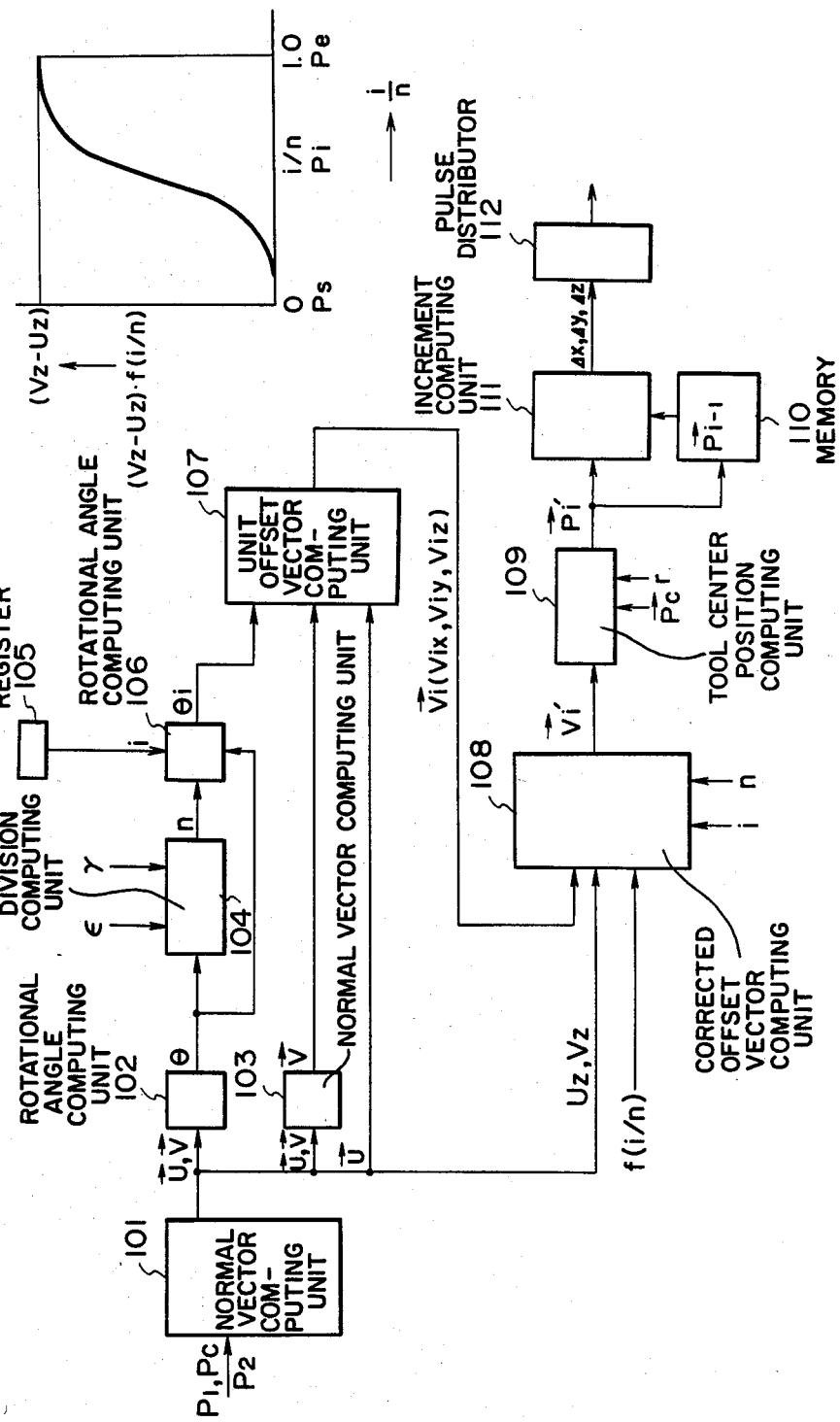

TOOL RADIUS COMPENSATION METHOD FOR NUMERICALLY CONTROLLED APPARATUS

BACKGROUND OF THE INVENTION

The present invention relates to a tool radius compensation method for a numerically controlled apparatus, and more particularly to a tool radius compensation method for a numerically controlled apparatus which is suitable for use in cutting a workpiece while offsetting a tool in a direction normal to a three-dimensional surface of the workpiece.

Numerically controlled (NC) apparatus usually have a tool radius compensation function. The tool radius compensation function corrects a cutting error due to a tool radius by defining as the passage of movement of a tool center a path that is displaced a distance equal to the tool radius rightward or leftward from a programmed path specified by numerical control information. With such a tool radius compensation method, however, the tool cuts into a corner formed between straight lines or a straight line and an arcuate line if it were not for preventive measures. There have heretofore been proposed various measures for moving the tool along corners to effect accurate tool radius compensation.

Assuming that there are two programmed paths defined along straight lines $L_1$ and $L_2$ extending at an angle $\alpha$ ranging from 90° to 180° as shown in FIG. 1, the process of tool radius compensation is carried out as follows. A movement command for a current block $b_1$ and a movement command for a next block $b_2$ are read in advance, and straight lines $L_1'$ and $L_2'$, which are offset by a tool radius $r_1$ from the straight lines $L_1$ and $L_2$, respectively, are determined for the current and next blocks $b_1$ and $b_2$. The coordinates of a point $S_1$ where the straight lines $L_1'$ and $L_2'$ intersect, as in FIG. 1(a), are then computed. By moving the tool from a final point $S_0$ in a previous block to the point $S_1$ through pulse distribution, the center of the tool follows a passage that is offset a distance equal to the radius $r$ from the properly commanded programmed path for thereby cutting the workpiece in accordance with the command.

Where the angle $\alpha$ is 90° or smaller, movement commands for the current and next blocks $b_1$ and $b_2$ are read beforehand, and straight lines $L_1'$ and $L_2'$ that are offset by a tool radius from straight lines $L_1$ and are formed $L_2$. Then, the coordinates of a point $S_1$ where the straight lines $L_1'$ and $L_2$ intersect, and the coordinates of a point $S_1'$ where the straight lines $L_1$ and $L_2'$ intersect, as in FIG. 1(b), are computed. The workpiece can be cut to the command by moving the tool from a final point $S_0$ in a previous block to the point $S_1$, then from the point $S_1$ to the point $S_1'$, and finally from the point $S_1'$ to a final point $S_2$ in the block $b_2$. FIG. 1(c) is illustrative of an example in which a straight line and an arcuate line which are to be cut are joined abruptly.

Where NC systems have such a tool compensation function, programming is quite simple as it is not necessary to take into account the tool radius in preparing an NC data tape. When the tool radius varies due to wear or use of a different tool, the workpiece can be cut correctly by using a tool radius setting dial on an NC system panel to make a tool radius setting, or supplying a tool radius input through a MDI (manual data input) terminal.

The foregoing illustrates an application in which the cutting of a corner in a two-dimensional plane is prevented by the tool radius compensation function. The same problem (the problem of cutting a corner) is caused when cutting a three-dimensional shape with a tool drive by a simultaneous triaxial drive system. FIG. 2 is a diagram explanatory of such a problem. Designated therein at $P_1$, Pc and $P_2$ are commanded points to be cut on a programmed path, $P_1'$ and Ps are positions which are offset respectively from the starting point $P_1$ and the ending point Pc on a first surface $SF_1$ to be cut ($\vec{P_1P_1'}$, $\vec{PcPs}$ indicate offset vectors), and Pe and $P_2'$ are positions which are offset respectively from the starting point Pc and the ending point $P_2$ on a second surface $SF_2$ to be cut ($\vec{PcPe}$, $\vec{P_2P_2'}$ indicate offset vectors). When the center of a tool as shown in FIG. 3(a) or (b) is moved along a path $P_1'Ps$ to cut the first surface $SF_1$, and then the tool center is moved along a path $PsP_2''$ without effecting tool position compensation at the corner, the tool cuts into the corner and fails to cut the workpiece correctly. To prevent this, the tool position needs to be corrected at the corner after the first surface $SF_1$ has been cut. One method of carrying out such tool position correction comprises the steps of finding the offset vector $\vec{PcPe}$ at the starting point on the second surface $SF_2$, then moving the tool center from the point Ps to the point Pe along an arc $\widehat{PsPe}$ which has the starting point Ps, the ending point Pe, and a radius of curvature equal to a tool radius r, and which lies on a plane formed by the offset vectors PcPs and PcPe of the first and second surfaces $SF_1$ and $SF_2$, and subsequently moving the tool center along an interval $PeP_2'$. This method could prevent the tool from cutting into the corner, but would leave a cutter mark on the corner since the paths $P_1'Ps$ and $PeP_2'$ of movement of the tool center and the arc PsPe would not be joined smoothly.

SUMMARY OF THE INVENTION

It is an object of the present invention to provide a novel tool radius compensation method for a numerically controlled apparatus which prevents a tool from leaving cutter marks on the corner and which prevents the tool from cutting into a corner where first and second surfaces to be cut intersect, while three dimensionally cutting a workpiece.

According to the present invention, a tool radius compensation method for a numerically controlled apparatus in which a tool and a workpiece are relatively moved by a triaxial drive to enable the tool to cut the workpiece three-dimensionally. The positional coordinates of the center of the tool, which are offset a distance equal to the radius of the tool in a direction normal to a surface to be cut, are computed from commanded positional information to effect such workpiece cutting, the method including the steps of:

determining a unit offset vector on a plane defined by vectors U and V which are normal to first and second surfaces to be cut at a three-dimensional corner point based on the positional information;

correcting components, along respective axes, of the unit offset vector which have been determined in the foregoing step so that the tool center will move along a smooth curve contiguous to paths of movement of the tool center before and after the three-dimensional corner point; and determining the coordinates of the position of the tool center from the corrected unit offset vector, the tool radius, and the information on the position of the three-dimensional corner point.

BRIEF DESCRIPTION OF THE DRAWINGS

FIGS. 4 through 7 are diagrams of a tool radius compensation method according to the present invention; and FIG. 8 is a block diagram of an arrangement for effecting the tool radius compensation method of the present invention.

DESCRIPTION OF THE PREFERRED EMBODIMENTS

The present invention will hereinafter be described in detail with reference to the drawings.

Figure 1A:
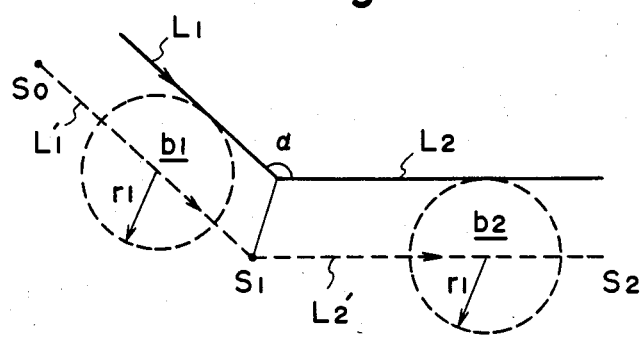
FIG. 1 is a set of diagrams of a tool radius compensation method for preventing a tool from cutting into a corner during a two-dimensional cutting operation.
Figure 1B:
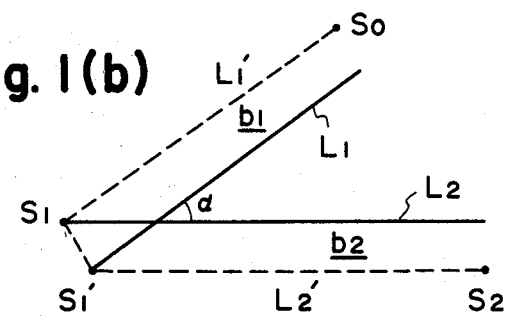
Figure 1C:
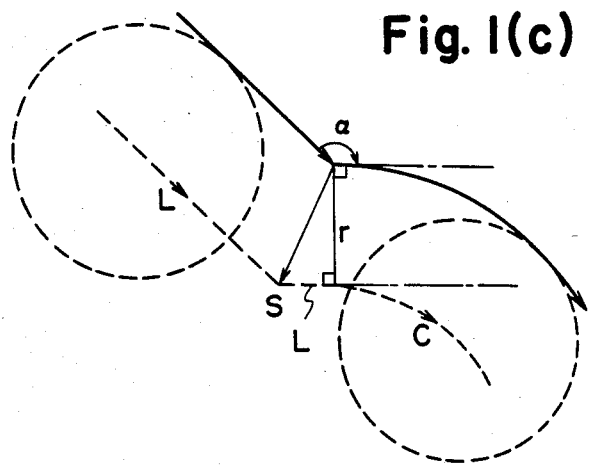
Figure 2:
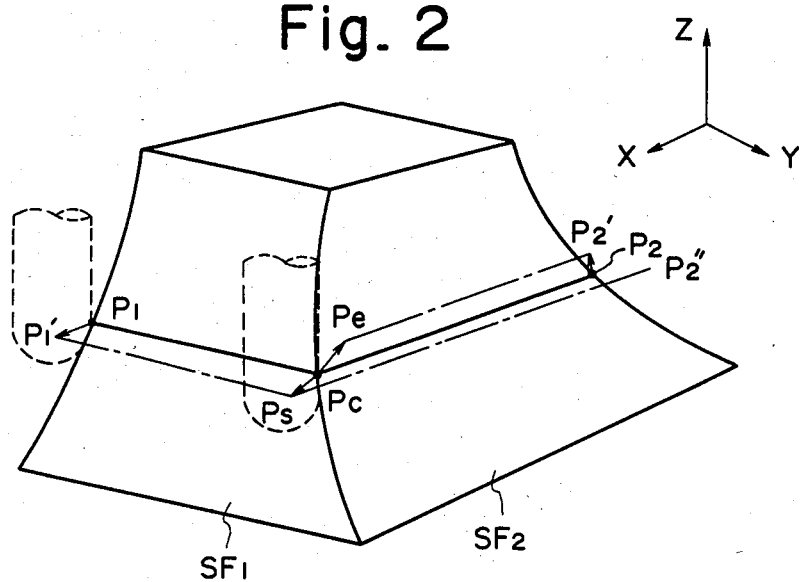
FIG. 2 is a diagram of the manner in which a tool moves around a corner while a workpiece is being cut three-dimensionally.
Figure 3A:
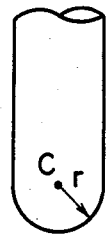
FIG. 3 is a set of diagrams of appearances of tools.
Figure 3B:
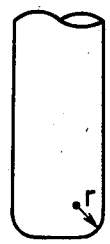
Figure 6:
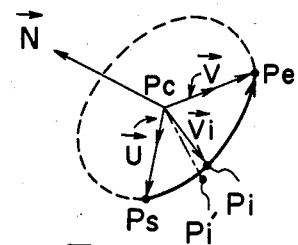
Figure 4:
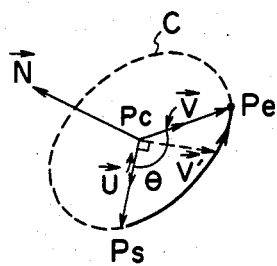

FIGS. 4 through 7 are diagrams of a tool radius compensation method for a numerically controlled apparatus according to the present invention. The invention will be described as being embodied for cutting a shape as shown in FIG. 2.

(A) First, unit vectors U and V, normal to the first and second surfaces $SF_1$ and $SF_2$, are found at the three-dimensional corner point Pc.

(B) Then, the tool centers Ps and Pe are computed by the following equations:

$$\vec{Ps} = \vec{Pc} + \vec{U} \cdot r$$

$$\vec{Pe} = \vec{Pc} + \vec{V} \cdot r$$

where r is the radius of a tool, and Pc is known because it is commanded by an NC cutting program.

(C) An imaginary arc C (FIG. 4) is determined which lies in a plane defined by the normal vectors $\vec{U}$ and $\vec{V}$ and has a center at the point Pc, a starting point at Ps, an ending point at Pe, and a radius of r.

(D) An angle $\theta$ formed between the points Ps and Pe on the arc C is computed from the following equation:

$$\theta = \tan^{-1}\left(\frac{|\vec{U} \times \vec{V}|}{\vec{U} \cdot \vec{V}}\right) \quad (3)$$

where "." indicates the inner product of the vectors, "x" the outer product of the vectors, and "| |" the absolute value.

(E) A vector N normal to a plane in which the arc C lies is computed from the following equation:

$$\vec{N} = \vec{U} \times \vec{V} \quad (4)$$

(F) A vector $\vec{V'}$ which lies on the plane in which the arc C lies and extends normally to the vector $\vec{U}$ is determined by the following equation:

$$\vec{V'} = \vec{N} \times \vec{U} \quad (5)$$

Figure 5:
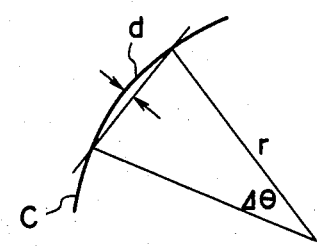

(G) The number of divisions n is determined for linearly approximating the arc C from the point Ps to the point Pe for interpolation. The number of divisions n can be found by computing the maximum number of divisions which makes the distance d shown in FIG. 5 smaller than an allowable error $\epsilon$. In FIG. 5, for example, the following equation is established:

$$\Delta\theta = 2 \cdot \cos^{-1}\left(\frac{r - \epsilon}{r}\right) \quad (6)$$

and hence the number of divisions n can be give by:

$$n = (\theta/\Delta\theta) \quad (7)$$

(H) A unit offset vector $\vec{Vi}$ (FIG. 6) is determined which interconnects the ith point Pi of the divisions n and the corner point Pc. Since the angle of rotation from the starting point to the point Pi is $$\theta i = \theta \times \frac{i}{n} \quad (8)$$

the unit offset vector $\vec{Vi}$ can be given as follows:

$$\vec{Vi} = \cos \theta i \times \vec{U} + \sin \theta i \times \vec{V'} \quad (9)$$

(I) The unit offset vector $\vec{Vi}$ is corrected so that the center of the tool will move along a curve lying in the plane in which the arc C lies and is connected smoothly to the paths $P_1'Ps$ and $PeP_2'$ of movement of the tool center before and after the three-dimensional corner. A method of correction will now be described.

The unit offset vector (normal vector) $\vec{U}$ at the starting point and the unit offset vector (normal vector) V at the ending point can be expressed respectively by:

$$\vec{U} = U(Ux, Uy, Uz)$$

$$\vec{V} = V(Vx, Vy, Vz)$$

The amount of displacement in the Z-axis direction is given by (Vz−Uz). A curve interconnecting the starting point Ps and the ending point Pe needs to be connected smoothly (continuously) to the paths $P_1'Ps$ and $PeP_2'$ of movement of the tool center before and after the corner point. Stated otherwise, increments in the Z-axis direction are required to be controlled so that the amount of displacement will be small in the vicinity of the starting point Ps and the ending point Pe and large in an intermediate interval in order to define the curve as shown in FIG. 7. In FIG. 7, the horizontal axis is indicative of i/n (the ith position of the partitions n) and the vertical axis of (Vz−Uz)·f(i/n). An example of the curve as illustrated in FIG. 7 may preferably be one which is expressed by:

$$f(t) = 3t^2 - 2t^3 \quad (10)$$

$0 \leq t \leq 1$ (t = i/n)

Therefore, where the curve (Vz−Uz)·f(i/n) is employed, components Vix', Viy', Viz' on the respective axes after a unit offset vector $\vec{Vi}$ (Vix, Viy, Viz) has been corrected is corrected as follows:

$$Viz' = Uz + f(i/n)(Vz - Uz) \quad (11)$$

$$Vix' = Vix \times D \quad (12)$$

$$Viy' = Viy \times D \quad (13)$$

where D is a coefficient of correction which is given by the following equation:

$$D = \sqrt{1 - (Viz')^2} / \sqrt{(Vix)^2 + (Viy)^2} \tag{14}$$

(J) From the corrected offset vector $\vec{Vi'}$(Vix', Viy', Viz'), the coordinates of the ith tool center point Pi' become:

$$\vec{Pi'} = \vec{Pc} + r \cdot \vec{Vi'}(Vix', Viy', Viz') \tag{15}$$

(K) Incremental values Δx, Δy and Δz on the X, Y and Z axes, respectively, are found from the coordinates of the tool center point Pi' and the coordinates of the tool center point which is one point ahead of the point Pi'. The tool center is moved on the basis of the incremental values Δx, Δy and Δz. Thereafter, the foregoing steps (H)–(K) are repeated from i=1 to i=n for changing the increments smoothly from the starting point Ps to the ending point Pe for the corner in order to move the tool center. There is no danger of the tool leaving cutter marks or cutting into the corner of the workpiece.

FIG. 8 is a block diagram showing an embodiment of the present invention.

Designated at 101 is a normal vector computing unit supplied with program path information (positional commands) $P_1$, Pc and $P_2$ commanded by the NC program for computing the normal vectors $\vec{U}$ and V, 102 is a rotational angle computing unit for computing the angle of rotation θ using the equation (3), 103 is a normal vector computing unit for computing the vector $\vec{V'}$ perpendicular to the normal vector $\vec{U}$ using the equations (4) and (5), 104 is a division computing unit for computing the number of divisions n using the equations (6) and (7) in linearly approximating the arc, 105 is a register for counting up its content to indicate the division number each time the coordinates of the division point Pi' are determined, 106 is a rotational angle computing unit for computing the angle of rotation θi from the starting point Ps to the ith division point Pi using the equation (8), 107 is a unit offset vector computing unit for computing the unit offset vector $\vec{Vi}$ using the equation (9), 108 is a corrected offset vector computing unit for determining the corrected offset vector Vi' (Vix', Viy', Viz') using the equations (11)–(14), 109 is a tool center position computing unit for finding the coordinates of the tool center point Pi' using the equation (15), 110 is a memory for storing data on the positional coordinates of the tool center point Pi', 111 is an increment computing unit for computing the incremental values Δx, Δy and Δz along the respective axes between a tool center position $\vec{Pi}-1$ that is one point ahead and the determined tool center position $\vec{Pi}$, and 112 is a pulse distributor for effecting pulse distribution computation based on the incremental values Δx, Δy and Δz.

With the present invention, as described above, a tool center is moved along a curve which lies in a plane defined by vectors U and V normal to first and second surfaces to be cut and which is connected smoothly to paths of movement of the tool center before and after a three-dimensional corner. Accordingly, the tool is prevented from leaving cutter marks or cutting into the corner.

The present invention is not limited to the illustrated embodiment, but may be subjected to various modifications. For example, although the apparatus shown in FIG. 8 comprises hardware components each having a single function, it may be composed of a computer. The present invention may be applied to an apparatus for preparing NC tapes.

What is claimed is:

1. A tool radius compensation method for a numerically controlled apparatus in which a tool, having a radius, and a workpiece having first and second surfaces, are moved relative to each other by a triaxial drive to enable the tool to three-dimensionally cut the workpiece, positional coordinates of the center of the tool, which is offset at a distance equal to the radius of the tool in a direction normal to a surface to be cut, being computed from commanded positional information to effect the workpiece cutting, said method comprising the steps of:
   (a) determining a unit offset vector on a plane defined by vectors normal to the first and second surfaces to be cut at a three-dimensional corner point of the workpiece based on the commanded positional information;
   (b) determining the coordinates of the position of the tool center from corrected components along respective X, Y and Z axes of the unit offset vector, the tool radius, and the position of the three-dimensional corner point; and
   (c) moving the tool center along a smooth curve contiguous to the path of movement of the tool center before and after the three-dimensional corner point has been cut.

2. A tool radius compensation method according to claim 1, wherein in said correcting step (b), the Z-axis component of the unit offset vector is corrected by a given function, and the X and Y-axis components of the unit offset vector are corrected by a coefficient of correction determined in dependence upon the corrected components of the unit offset vector.

3. A tool radius compensation method according to claim 2, further comprising the substep of varying the given function in the Z-axis direction by a first amount in the vicinity of an ending point of the path of movement of the tool center before the three-dimensional corner point and in the vicinity of a starting point of the path of movement of the tool center after cutting the three-dimensional corner point, and varying the given function in the Z-axis direction by a second amount, which is larger than the first amount, in an intermediate interval between the ending point and starting point of the path of movement of the tool.

4. A tool radius compensation method for a numerically controlled apparatus, operatively connected to receive commanded positional information, in which a tool, having a radius, and a workpiece, having first and second surfaces, are relatively moved to enable the tool to three-dimensionally cut the workpiece in accordance with positional coordinates of the tool which are computed in dependence upon the commanded positional information, said method comprising the steps of:
   (a) determining a unit offset vector on a plane, defined by vectors normal to the first and second surfaces to be cut at a three-dimensional corner point of the workpiece, based on the commanded positional information;
   (b) correcting components, along respective X, Y and Z axes, of the unit offset vector, and determining the coordinates of the position of the tool center from the corrected components of the unit offset vector, the tool radius and the position of the three-dimensional corner point; and (c) moving the tool center along a smooth curve contiguous to the path movement of the tool center before and after the three-dimensional corner point has been cut.

5. A tool radius compensation method according to claim 4, wherein in said correcting step (b), the Z-axis component of the unit offset vector is corrected by a given function and the X and Y axis components of the unit offset vector are corrected by a coefficient of correction determined in dependence upon the corrected components of the unit offset vector.

6. A tool radius compensation method according to claim 4, wherein said steps (a), (b) and (c) are carried out using a computer.

* * * * *

UNITED STATES PATENT AND TRADEMARK OFFICE
CERTIFICATE OF CORRECTION

PATENT NO. : 4,659,265

DATED : April 21, 1987

INVENTOR(S) : Kishi et al.

It is certified that error appears in the above-identified patent and that said Letters Patent is hereby corrected as shown below:

Column 1, line 49, "and are formed" should be --and $L_2$ are formed.--;

line 50, delete "$L_2$.",

Column 2, line 6, "drive" should be --driven--;

line 30, "PcPs and PcPe" should be --$\overrightarrow{PcPs}$ and $\overrightarrow{PcPe}$--;

line 36, "$P_1$'Ps and PeP2'" should be --$P_1$'Ps and $PeP_2$'--;

line 37, "PsPe" should be --$\overparen{PsPe}$--.

Column 3, line 55, "N" should be --$\vec{N}$--;

line 58, eq. (4), "$\vec{N} = \vec{U}$" should be --$\vec{N} = \vec{U}$--.

Column 4, line 10, "give" should be --given--;

UNITED STATES PATENT AND TRADEMARK OFFICE
CERTIFICATE OF CORRECTION

PATENT NO. : 4,659,265

DATED : April 21, 1987

INVENTOR(S) : Kishi et al.

It is certified that error appears in the above-identified patent and that said Letters Patent is hereby corrected as shown below:

Column 4, line 33, "V" should be $--\vec{V}--$;

line 62, change "is" to --are--.

Signed and Sealed this

Twentieth Day of October, 1987

Attest:

DONALD J. QUIGG

*Attesting Officer*  *Commissioner of Patents and Trademarks*